(12) United States Patent
Fischer et al.

(10) Patent No.: US 6,393,596 B1
(45) Date of Patent: May 21, 2002

(54) MISSING PULSE DETECTOR USING SYNCHRONOUS DETECTION

(75) Inventors: Michael C. Fischer, Palo Alto; Josh Hogan, Los Altos; Terril Hurst, Fremont; Daniel Y. Abramovitch, Palo Alto; Carl Taussig, Woodside, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,832

(22) Filed: Oct. 30, 1998

(51) Int. Cl.[7] ............... G11C 29/00; G01R 19/00; H03K 5/00
(52) U.S. Cl. ............... 714/769; 327/18; 327/20; 327/551; 386/22
(58) Field of Search .................. 714/769; 386/22, 386/26, 25, 23, 39, 21; 327/18, 20, 551–559; 329/313

(56) References Cited

U.S. PATENT DOCUMENTS

| 4,197,565 A | * | 4/1980 | Watanabe ............... 360/77.16 |
| 4,419,698 A | * | 12/1983 | Shirashi et al. ............... 386/26 |
| 4,704,639 A | * | 11/1987 | Yamanishi et al. ........... 386/26 |
| 4,816,769 A | * | 3/1989 | Ma et al. ..................... 329/315 |
| 5,218,448 A | * | 6/1993 | Honjo et al. ................... 386/22 |

FOREIGN PATENT DOCUMENTS

| EP | 0874356 A | 10/1998 | ............ G11B/7/00 |
| JP | 401032521 A | * 2/1989 | ................. 327/205 |

* cited by examiner

Primary Examiner—Emmanuel L. Moise

(57) ABSTRACT

A data decoder for decoding digital data in a high frequency signal in an optical storage device. A carrier signal derived from the high frequency passed through a zonal bandpass filter and a limiter is multiplied by the high frequency signal passed through a high pass filter. The resulting product is filtered and passed through a comparator forming a digital data stream.

22 Claims, 3 Drawing Sheets

MISSING PULSE DETECTOR USING SYNCHRONOUS DETECTION

BACKGROUND OF THE INVENTION

FIELD OF THE INVENTION

Optical storage systems such as DVD-RAM and DVD+ RW offer the ability to store large amounts of digital information. Derived from earlier Compact Disc technology, information is stored along a single groove spiraling along the disc. For writeable and rewriteable systems, addressing information must be provided which allows the single long spiral to be divided into storage segments. In DVD+RW and DVD-RAM systems, disk address information may be encoded in missing pulses in a high frequency wobble signal placed along the recording groove.

Detecting these missing pulses in the high frequency wobble signal is made more difficult by crosstalk from other signals and noise inherent in the system, such as that introduced by the tracking process.

SUMMARY OF THE INVENTION

Address information encoded in a high frequency wobble signal in an optical storage subsystem is detected as missing pulses in the high frequency wobble signal using an homodyne synchronous detector. The input signal from an optical pickup is fed to a zonal bandpass filter then processed by a limiter. The input signal is also fed through a high pass filter to eliminate low frequency components. An analog multiplier forms the product of these two signals. The output of the analog multiplier is passed through low pass and high pass filters to remove noise, then passed to a threshold detector which outputs a signal indicating a missing wobble pulse.

BRIEF DESCRIPTION OF THE DRAWINGS

The present invention is described with respect to particular exemplary embodiments thereof and reference is made to the drawings in which.

DETAILED DESCRIPTION

Figure 1:
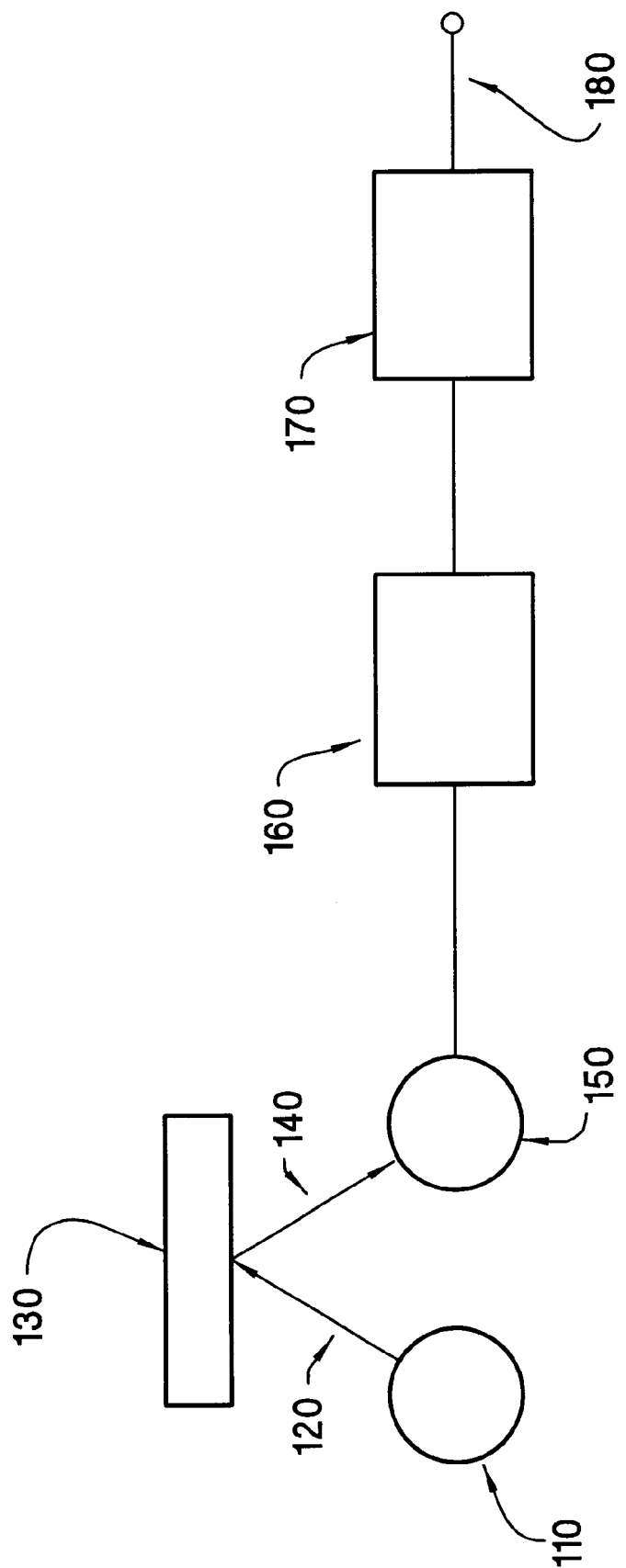
FIG. 1 shows a block diagram of a portion of an optical storage subsystem incorporating the present invention.

FIG. 1 shows the block diagram of a portion of an optical data storage subsystem. For simplicity, large blocks not pertinent to the present invention, such as head tracking, data encoding and decoding, power supplies, and the like are not shown. Laser 110 illuminates 120 rotating optical storage medium 130. Reflected light 140 is detected by optical pickup 150. Optical pickup 150 is typically divided into quadrants, producing a number of different signals. Normalizer 160 produces a variety of signals from optical pickup 150, such as normalized radial push-pull and tangential push-pull signals of constant amplitude. In one embodiment, the normalized push-pull signal is passed to missing wobble detector 170, producing output signal 180, a digital bit stream containing the address information.

Figure 2:
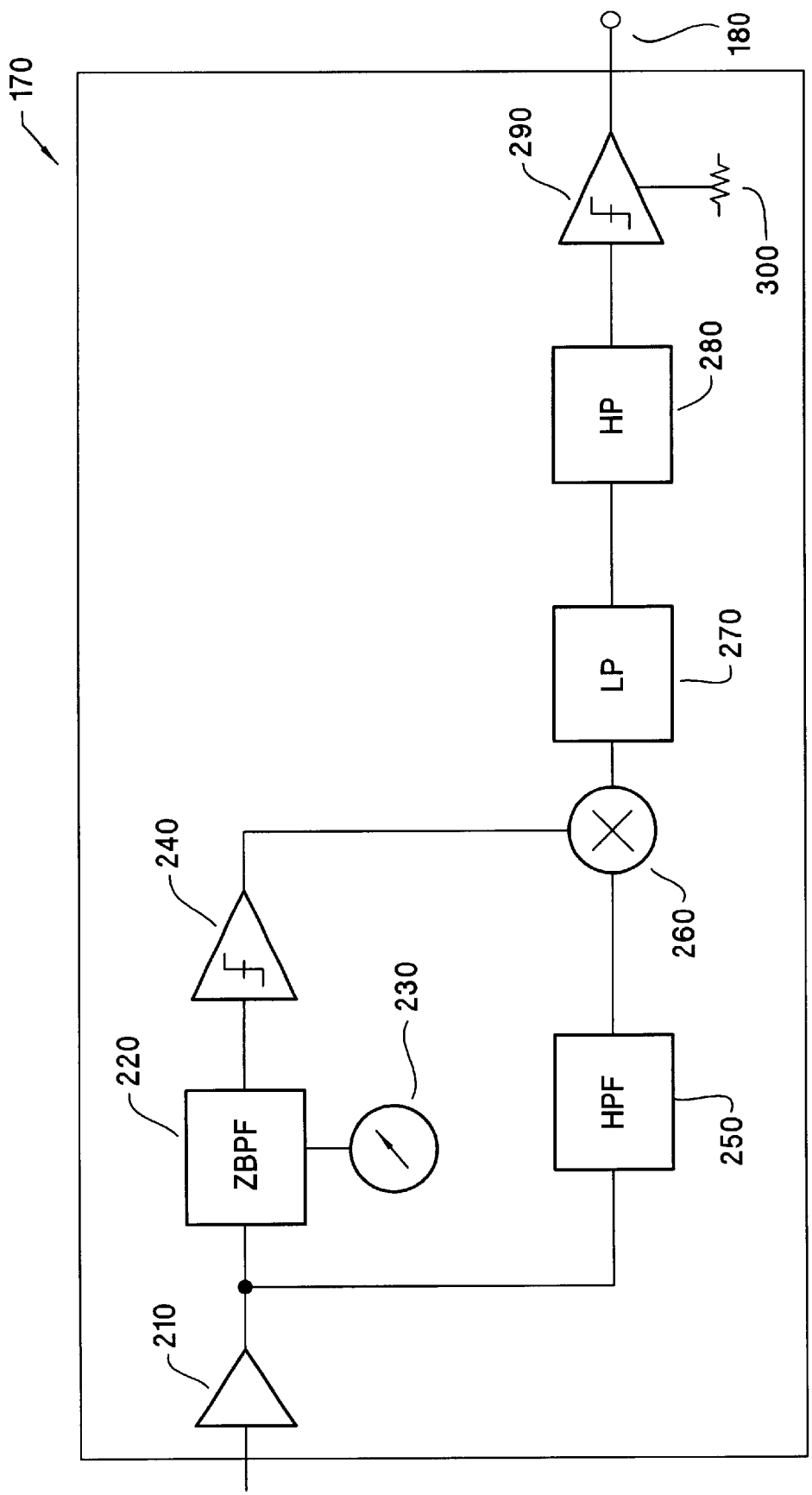
FIG. 2 shows a block diagram of the missing wobble detector.

FIG. 2 shows the missing wobble detector 170 of FIG. 1 in greater detail. Buffer 210 is optional and drives zonal bandpass filter 220 and high pass filter 250. While shown as a unity gain device, an amplifier with a gain larger than one may be used if needed. Any high performance operational amplifier, such as the CLC440 from National Semiconductor may be used for buffer 210.

In one embodiment of the present invention the normalized push-pull tracking error signal from optical pickup 150 and normalizer 160 of FIG. 1. contains a mixture of different signals and noise. The high frequency wobble signal of interest in the present invention is a sinusoid near 3 megahertz (MHz) in a constant linear velocity (CLV) system, and ranges from approximately 3 to 7 MHz in a constant angular velocity (CAV) system. Noise and crosstalk from data along with other signals, such as the much lower frequency tracking error signal, are also present. Information is encoded in the wobble signal in the form of missing pulses. One or more cycles of the sinusoid are missing in a pattern to denote data.

The signal from buffer 210 of FIG. 2 is passed to zonal bandpass filter 220. This filter 220 has two functions. The first is to pass only the frequency band of interest. For a CLV implementation, this is a fixed frequency of approximately 3 MHz. For a CAV implementation, the frequency varies and zonal bandpass filter 220 either is wider or uses a tracking filter or PLL centered on the expected wobble frequency. The present invention will be described with particularity for the CLV approach. Zonal bandpass filter 220 attenuates frequencies away from the wobble frequency and also includes phase adjustment 230. Phase adjustment 230 allows the phase of the signal to be shifted to match the phases of the signals input to analog multiplier 260.

Zonal bandpass filter 220 also has sufficient "Q" to cause the wobble signal to ring through missing wobbles, providing sufficient signal to limiter 240 to produce a continuous wobble signal even during missing pulses. When a tuned circuit is being excited at its resonant frequency and the signal is removed, the tuned circuit continues to ring at that frequency for a number of cycles, decaying over time. In the preferred embodiment, a Q of 3 or greater is sufficient to provide a signal to limiter 240 so that it produces a continuous square wave output at the wobble frequency even in the presence of missing pulses. Limiter 240 may be any high speed comparator, such as the MAX903 from Maxim used in the preferred embodiment.

The output of buffer 210 is also sent through high pass filter 250 to remove low frequency noise, typically track wander interference. In the preferred embodiment this is a simple first order filter with a cutoff frequency of 300 kHz, an order of magnitude less than the resonant frequency of zonal bandpass filter 220.

Analog multiplier 260 forms the product of the input signal from high pass filter 250, the wobble signal with missing pulses, and the carrier signal from limiter 240, a square wave at the wobble signal frequency with no missing pulses. This product has the appearance of a full wave rectified signal of only the frequency of interest, that of zonal bandpass filter 220, eliminating noise at other frequencies. In the preferred embodiment, analog multiplier 260 is a Gilbert cell multiplier, the MC1496 from Motorola.

Low pass filter 270 smoothes the output of analog multiplier 260 and attenuates high frequency noise; in the preferred embodiment it is a first order filter with a cutoff of 500 kHz. For better performance a linear phase response filter of higher order, such as a Bessel filter may also be used.

The signal is further filtered by high pass filter 280, which rejects low frequency variations arising from changes in the amplitude of the input signal to buffer 210. In the preferred embodiment this is also a first order filter with a cutoff frequency under 10 Hz, effectively a DC block.

The resulting filtered signal is an envelope which is near zero when the wobble is present and nonzero in its absence; this filtered signal is passed through threshold comparator 290, triggering at the level set by threshold adjustment 300. The output of threshold comparator 290 is a digital signal indicating the presence and absence of the wobble signal.

Figure 3:
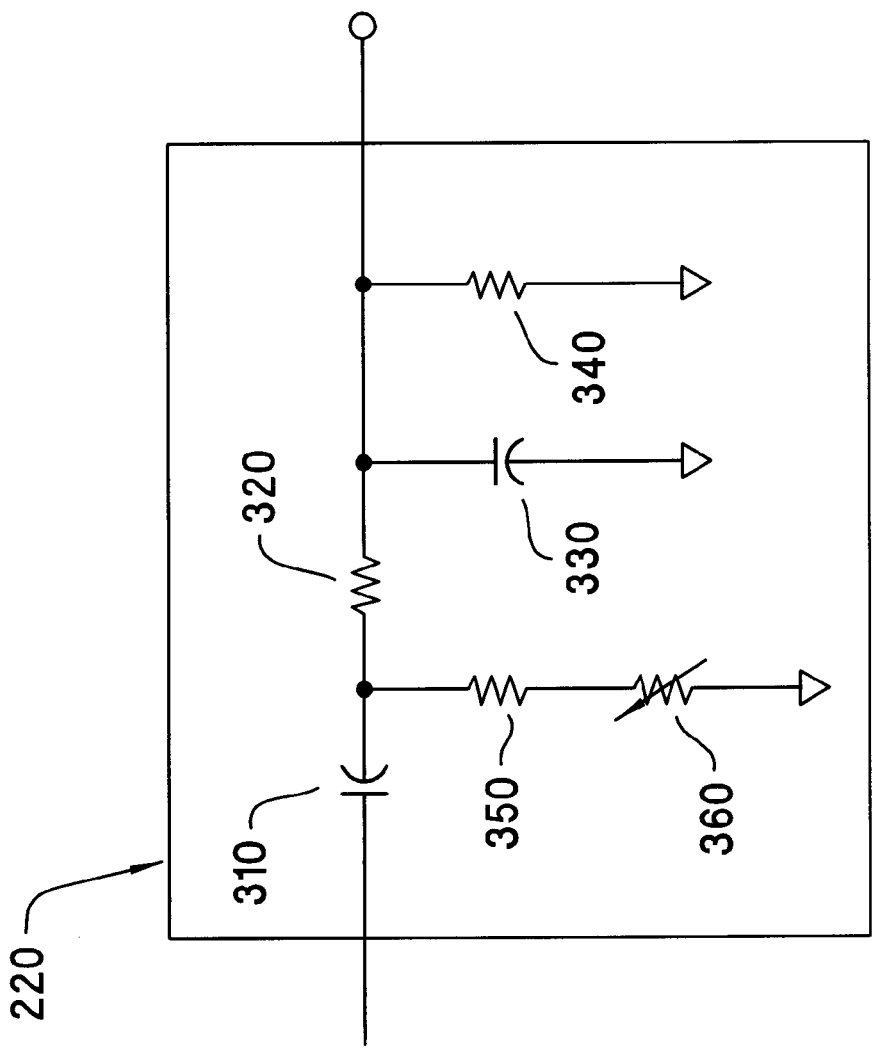
FIG. 3 shows the zonal bandpass filter in greater detail.

FIG. 3 shows one embodiment of the zonal bandpass filter 220 in greater detail. The zonal bandpass filter consists of the parallel resonant circuit made from inductor 340, capacitor 330, and Q setting resistor 320. Capacitor 310 blocks any DC levels present at the output of buffer 210. The zonal bandpass filter passes energy at the frequencies of interest by providing a high impedance at the resonant frequency of the LC combination 340 and 330. The impedance of this LC network decreases away from the resonant frequency, attenuating signals out of the desired band. Resistor 320 sets the Q, or shape factor for the filter. In the preferred embodiment, the Q is approximately 3, sufficient to ring through missing pulses. Resistor network 350 and 360 form phase adjustment 230, allowing the phase shift through the network to be varied.

For a reference frequency of approximately 3 MHz, capacitor 310 is 100 nanofarads. Resistor 320 is 100 ohms. Capacitor 330 is 3.9 nanofarads and inductor 340 is 680 nanohenries. Resistor 350 is 1 kohms and variable resistor 360 is 5 kohms. These component values may be scaled as is known in the art.

An alternative embodiment of the zonal bandpass filter is the use of a Phase Locked Loop (PLL). Using a PLL to filter the input signal allows the filter to track a wider range of frequencies, while providing the ability to provide a continuous signal during missing pulses.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method of decoding digital information encoded in missing cycles of a first high frequency signal in an optical storage device comprising:

bandpass filtering the first high frequency signal to generate a second high frequency signal, the second high frequency signal having continuous cycles, forming a product signal from the first and second high frequency signals, and processing the product signal to produce a digital output, the digital output indicating the missing cycles in the first high frequency signal.

2. The method of claim 1 wherein the bandpass filtering is performed at a fixed frequency.

3. The method of claim 1 wherein the bandpass filtering is performed by tracking at an expected wobble frequency.

4. An optical data storage device with apparatus for decoding digital data encoded in missing cycles of a high frequency signal comprising:

a zonal bandpass filter for filtering the high frequency signal, a limiter, connected to an output of the zonal bandpass filter, for producing a carrier signal, a high pass filter for filtering the high frequency signal, an analog multiplier for multiplying the carrier signal by the filtered high frequency signal to produce a product signal, a filter for filtering the product signal, and a comparator fed by the filtered product signal, the comparator producing a digital output.

5. The optical data storage device of claim 4 where the zonal bandpass filter operates at a fixed frequency.

6. The optical data storage device of claim 4 where the zonal bandpass filter is a tracking filter.

7. The optical data storage device of claim 4 where the zonal bandpass filter is a phase locked loop.

8. The optical data storage device of claim 4 where the filter for the product signal comprises low pass and high pass filters.

9. The optical data storage device of claim 4 where the low pass filter is a first order filter.

10. The optical data storage device of claim 8 where the low pass filter is a linear phase response filter with an order greater than one.

11. The optical data storage system of claim 4 where the analog multiplier is a Gilbert cell.

12. In an optical data storage device using missing cycles in a high frequency signal to encode digital data, a data detector comprising:

a zonal bandpass filter for filtering the high frequency signal, a limiter, connected to an output of the zonal bandpass filter, for producing a carrier signal, a high pass filter for filtering the high frequency signal, an analog multiplier for multiplying the carrier signal by the filtered high frequency signal to produce a product signal, a filter for filtering the product signal, and a comparator fed by the filtered product signal, the comparator producing a digital output.

13. The data detector of claim 12 where the zonal bandpass filter operates at a fixed frequency.

14. The data detector of claim 12 where the zonal bandpass filter is a tracking filter.

15. The data detector of claim 12 where the zonal bandpass filter is a phase locked loop.

16. The data detector of claim 12 where the filter for the product signal comprises low pass and high pass filters.

17. The data detector of claim 16 where the low pass filter is a first order filter.

18. The data detector of claim 16 where the low pass filter is a linear phase response filter with an order greater than one.

19. The data detector of claim 12 where the analog multiplier is a Gilbert cell.

20. An optical storage device comprising:

an optical pickup unit for providing a first signal indicating wobble information, the wobble information encoded in terms of missing pulses;

a bandpass filter, responsive to the first signal, for generating a second signal indicating continuous wobble pulses; and a circuit for combining the first and second signals to detect the missing wobble pulses in the first signal.

21. The device of claim 20 wherein the bandpass filter includes a resonant circuit.

22. Apparatus for determining missing pulses in a first signal, the first signal indicating information that is encoded in terms of missing pulses, the apparatus comprising:

a bandpass filter, responsive to the first signal, for generating a second signal indicating continuous pulses; and a circuit for combining the first and second signals to detect the missing pulses in the first signal.

* * * * *